United States Patent [19]

Wilde et al.

[11] Patent Number: 4,497,765

[45] Date of Patent: * Feb. 5, 1985

[54] PROCESS FOR MAKING A CLOSURE

[75] Inventors: Sheldon L. Wilde; Thomas J. McCandless, both of Crawfordsville; Robert M. Saunders, Ladoga, all of Ind.

[73] Assignee: H-C Industries, Inc., Crawfordsville, Ind.

[*] Notice: The portion of the term of this patent subsequent to Aug. 10, 1999 has been disclaimed.

[21] Appl. No.: 390,346

[22] Filed: Jun. 22, 1982

Related U.S. Application Data

[63] Continuation-in-part of Ser. No. 77,584, Sep. 21, 1979, Pat. No. 4,343,754.

[51] Int. Cl.³ .................... B29C 13/02; B29D 9/08
[52] U.S. Cl. .................... 264/268; 215/252; 264/230; 264/250; 264/266; 264/274; 425/110; 425/127; 425/291; 425/809
[58] Field of Search .............. 264/266, 267, 268, 269, 264/274, 250, 154, 230, 291; 425/809, 291, 110, 112, 127; 215/252, 343, 344, 350

[56] References Cited

U.S. PATENT DOCUMENTS

| | | | |
|---|---|---|---|
| 2,068,389 | 1/1937 | Smith | 215/350 |
| 2,423,582 | 7/1947 | Coleman | 215/252 |
| 2,688,776 | 9/1954 | Evans et al. | 264/268 |
| 2,823,422 | 2/1958 | Schneider | 264/268 |
| 2,840,858 | 7/1958 | Rainer et al. | 264/265 |
| 3,189,209 | 6/1965 | Owens | 215/329 |
| 3,249,247 | 3/1966 | Babiol | 215/252 |
| 3,325,576 | 6/1967 | Kessler | 264/318 |
| 3,329,295 | 7/1967 | Fields | 215/252 |
| 3,425,579 | 2/1969 | Braun et al. | 215/329 |
| 3,462,034 | 8/1969 | Friedberg | 215/329 |
| 3,493,995 | 2/1970 | Green | 425/128 |
| 3,536,224 | 10/1970 | Green | 215/344 |
| 3,673,761 | 7/1972 | Leitz | 215/252 |
| 3,788,510 | 1/1974 | Collins | 215/341 |
| 3,929,246 | 12/1975 | Leitz | 215/252 |
| 3,958,910 | 5/1976 | Wilde | 425/127 |
| 4,088,730 | 5/1978 | Wilde | 264/268 |
| 4,090,631 | 5/1978 | Grussen | 215/329 |
| 4,155,698 | 5/1979 | Aichinger | 425/556 |
| 4,196,818 | 4/1980 | Brownbill | 215/252 |
| 4,308,965 | 1/1982 | Dutt | 215/345 |
| 4,312,824 | 1/1982 | Mori et al. | 425/809 |
| 4,322,009 | 3/1982 | Mumford | 215/253 |
| 4,331,249 | 5/1982 | Banich, Sr. | 215/343 |
| 4,333,577 | 6/1982 | Mumford | 215/246 |
| 4,343,754 | 8/1982 | Wilde et al. | 264/154 |
| 4,378,893 | 4/1983 | Wilde et al. | 215/343 |
| 4,407,422 | 10/1983 | Wilde et al. | 215/343 |
| 4,418,828 | 12/1983 | Wilde et al. | 215/252 |

FOREIGN PATENT DOCUMENTS

| | | |
|---|---|---|
| 4737468 | 6/1971 | Australia . |
| 697431 | 11/1964 | Canada . |
| 8190 | 2/1980 | European Pat. Off. . |
| 12802 | 6/1980 | European Pat. Off. . |
| 25991 | 4/1981 | European Pat. Off. . |
| 26405 | 4/1981 | European Pat. Off. . |
| 2035467 | 2/1971 | Fed. Rep. of Germany . |
| 851275 | 1/1970 | France . |
| 2290364 | 6/1976 | France . |
| 56-74445 | 6/1981 | Japan . |
| 464721 | 12/1968 | Switzerland . |
| 283447 | 1/1928 | United Kingdom . |
| 1052734 | 12/1966 | United Kingdom . |
| 1054308 | 1/1967 | United Kingdom ............ 215/252 |
| 1112392 | 5/1968 | United Kingdom . |
| 1283479 | 7/1972 | United Kingdom . |
| 1361180 | 7/1974 | United Kingdom . |
| 2033350 | 5/1980 | United Kingdom . |
| 2034674A | 6/1980 | United Kingdom . |
| 1577663 | 10/1980 | United Kingdom . |

Primary Examiner—Jay H. Woo
Assistant Examiner—James C. Housel
Attorney, Agent, or Firm—Dressler, Goldsmith, Shore, Sutker & Milnamow, Ltd.

[57] ABSTRACT

A novel closure-making process and apparatus are disclosed for formation of plastic closures. The closures include a plastic closure cap which is compression molded to provide a closure having the requisite strength. The process includes steps for formation of a sealing liner within the closure cap if desired, with formation of a novel liner-retaining arrangement provided for secure retention of the liner within the cap. The process also includes steps for formation of a tamper-indicating pilfer band integrally with the plastic cap of the closure for formation of closures requiring a suitable tamper-indicating device.

52 Claims, 15 Drawing Figures

PROCESS FOR MAKING A CLOSURE

CROSS-REFERENCE TO RELATED APPLICATIONS

The present application is a continuation-in-part of U.S. Ser. No. 077,584, filed Sept. 21, 1979, now U.S. Pat. No. 4,343,754, and is related to U.S. application Ser. No. 270,241, filed June 4, 1981 now U.S. Pat. No. 4,378,893, Ser. No. 286,375, filed July 24, 1981, now U.S. Pat. No. 4,418,828 and Ser. No. 310,769, filed Oct. 13, 1981 now U.S. Pat. No. 4,407,422.

TECHNICAL FIELD

The present invention relates generally to formation of closures for containers, and more particularly to an improved closure-making process and apparatus for making a closure which may be provided with a sealing liner and/or a tamper-indicating pilfer band.

BACKGROUND OF THE INVENTION

As discussed in parent application Ser. No. 077,584, now U.S. Pat. No. 4,343,754, various techniques are known for manufacture of closures for bottles and like containers. More recently, the advantages of the use of plastic closures have been recognized, although problems have been encountered in designing and manufacturing a plastic closure having the requisite strength and sealing capabilities. In this regard, parent application Ser. No. 077,584, now U.S. Pat. No. 4,343,754, discloses a process and apparatus for manufacture of plastic closures which have proven quite successful, and portions of that application not inconsistent with the present disclosure are incorporated herein by reference.

In addition to exhibiting the requisite strength and sealing properties, some closures must be formed with a tamper-indicating pilfer band. Most previously known pilfer band arrangements require that the container to which the closure is applied includes a specially shaped surface for coaction with the pilfer band, or require additional manufacturing steps after the closure is applied to a container so that the pilfer band correctly coacts with the container for indicating closure removal. Thus, formation of a plastic closure having a tamper-indicating pilfer band which overcomes drawbacks in pilfer band arrangements heretofore known is desirable.

Accordingly, a closure-making process and apparatus which facilitate manufacture of plastic closures, and permit closure formation with a sealing liner if desired, with or without a pilfer band, represent a significant advance in the art.

SUMMARY OF THE INVENTION

A plastic closure-making process and apparatus are disclosed which greatly facilitate manufacture of plastic closures for containers. Closures formed in accordance with the present invention may include a sealing liner, and may also be formed with a tamper-indicating pilfer band.

The present process includes formation of a plastic closure cap by compression molding. The cap is generally cup-like, and includes a top wall portion and an integral, depending annular skirt portion. An internal thread formation may be provided on the annular skirt portion for cooperation with a like thread formation on a container to which the closure is applied.

When a so-called composite closure having a sealing liner is to be formed, the present process provides for formation of the closure cap with an inwardly extending anhular lip spaced from the top wall portion of the cap and defining an annular recess therewith. Formation of the annular lip permits in situ formation of a sealing liner in the cap, with the annular lip acting to retain the liner within the cap to effect proper sealing. Liner retention can be further enhanced by formation of at least one liner-engaging projection integrally with the top wall portion of the plastic cap. In the preferred form, a plurality of circumferentially spaced, liner-engaging projections are formed in association with the annular lip of the plastic cap, with the projections and the annular lip cooperating to securely retain the sealing liner within the closure cap.

Whether or not closures formed include a sealing liner, the present invention provides for formation of closures having an improved tamper-indicating pilfer band. The closure pilfer band formed includes a plurality of circumferentially spaced, relatively flexible wings or projections. The wings are adapted to engage the container during closure removal so that the pilfer band is at least partially detached from the plastic cap of the closure. Significantly, the pilfer band formed is "self-engaging" in nature, and functions to indicate partial or complete closure removal without the use of specially configured containers, and without the need for further manufacturing steps after the closure is applied to a container.

A more detailed explanation of the invention is provided in the following description and appended claims taken in conjunction with the accompanying drawings.

DETAILED DESCRIPTION

Figure 1:
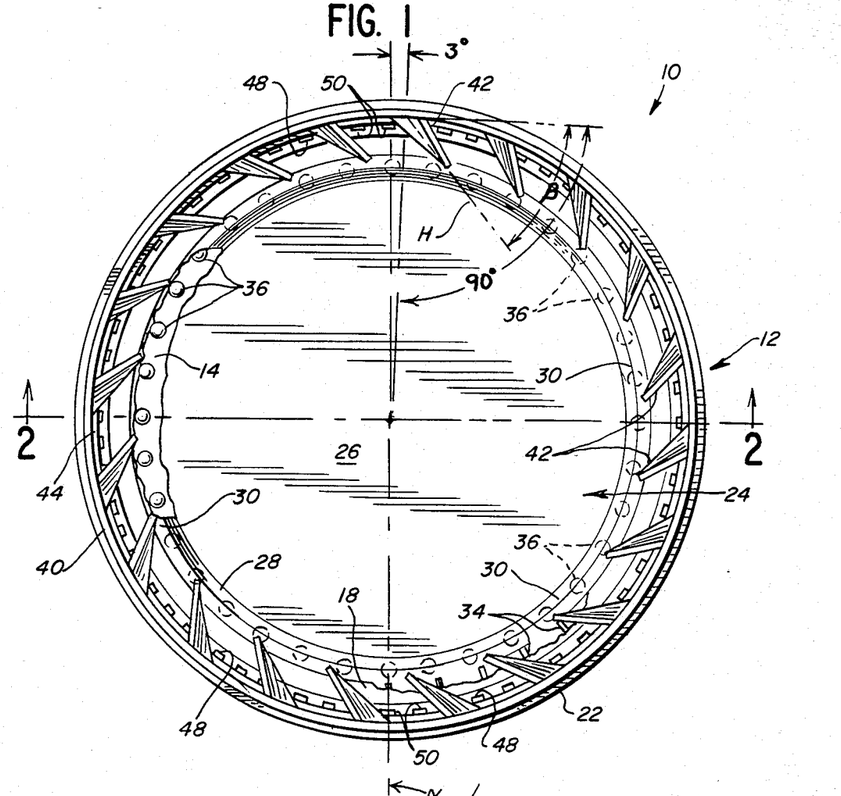
FIG. 1 is a top plan view of a plastic closure formed in accordance with the present invention.
Figure 2:
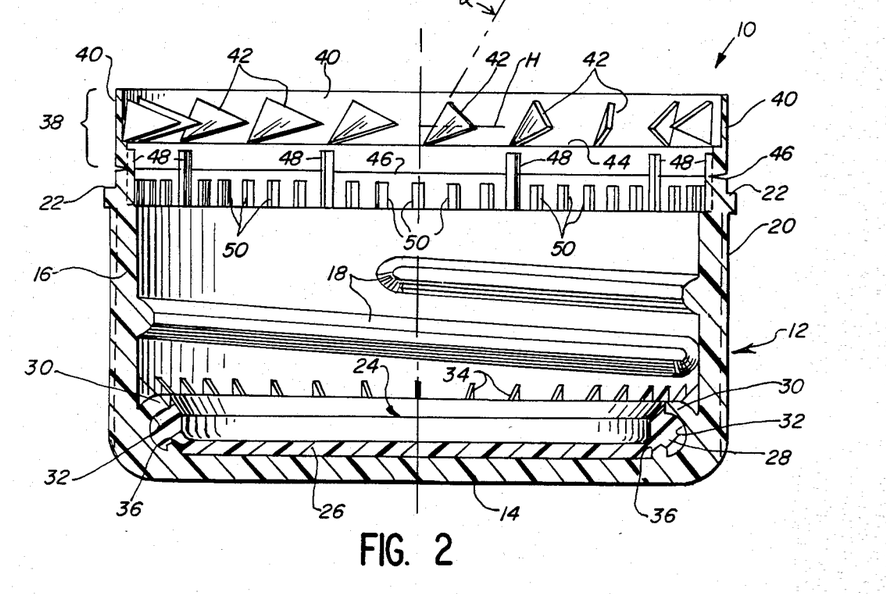
FIG. 2 is a side elevational view in cross-section of the closure of FIG. 1.

Referring to FIGS. 1 and 2, a plastic closure 10 formed in accordance with the present invention is illustrated. Closure 10 includes a cup-like plastic closure cap or shell 12 having a top wall portion 14 and a generally cylindrical, annular skirt portion 16 integral with the top wall portion 14. An internal thread formation 18 (shown partially cutaway in FIG. 1) is provided on the inside of skirt portion 16 which is adapted to cooperate with a like thread formation on the container to which the closure is applied. The exterior of skirt portion 16 is provided with a plurality of circumferentially spaced finger ribs 20 to facilitate manipulation of the closure.

Ribs 20 terminate at an annular outer shoulder 22. Cap 12 is preferably made of moldable thermoplastic, such as polypropylene or polyethylene. Other materials can also be used.

Closure 10 is of the so-called composite type, and includes a plastic sealing liner 24 disposed generally adjacent top wall portion 14. Liner 24 (shown partially cutaway in FIG. 1) includes a disc-shaped central portion 26, and an annular sealing bead portion 28. Bead portion 28 is adapted to sealingly engage an outwardly facing surface of the container to which the closure is applied, thereby providing a so-called side seal. Liner 24 is preferably made of moldable thermoplastic, such as polyvinyl chloride (PVC). Other liner materials, such as ethylene vinyl acetate (EVA) can also be used. As noted, closures formed in accordance with the present invention need not include a sealing liner such as 24.

Secure retention of sealing liner 24 within cap 12 assures proper sealing of a container by the closure. To this end, cap 12 is formed with a liner-retaining annular lip 30 extending inwardly of skirt portion 16. Lip 30 (shown partially cutaway in FIG. 1) is spaced from top wall portion 14, and defines an annular recess 32 therewith within which is positioned at least a portion of bead portion 28 of liner 24. A plurality of circumferentially spaced reinforcing gussets 34 extending integrally between skirt portion 16 and lip 30 can be provided for reinforcing the lip 30. Preferably, annular recess 32 is formed with a maximum internal diameter greater than the inside diameter of thread formation 18.

Notably, the configuration of lip 30, as well as gussets 34, permits the lip to exhibit some flexibility in a direction away from top wall portion 14, while resisting deflection in a direction toward the top wall portion. This facilitates removal of the lip 30 from the portion of the mold in which it is formed. This also permits some deflection of the lip 30 away from wall portion 14 when the closure is fitted to a container, which is desirable since bead portion 28 of liner 24 is deformed during sealing engagement with a container, and the one-directional flexibility of lip 30 accommodates such deformation of bead portion 28. Further, the surface of lip 30 which generally faces top wall portion 14 is non-horizontal and generally extends away from the top wall portion. This configuration of lip 30 further facilitates removal of cap 12 from the molding apparatus without damage to the lip 30.

While lip 30 provides significant retention of sealing liner 24, liner retention can be enhanced by providing at least one liner-engaging projection integral with top wall portion 14. In the preferred form, a plurality of circumferentially spaced, liner-engaging projections 36 are formed integrally with top wall portion 14 in generally normal relation thereto. Projections 36 are preferably generally cylindrical and straight-sided, and are preferably arranged in a ring in close association with annular lip 30 so that the projections 36 cooperate with lip 30 for retention of liner 24 within cap 12. Various arrangements of liner-engaging projections, and various projection sizes and configurations can be used in accordance with the teachings herein. Projections 36 can, but need not, be partially or completely disposed within annular recess 32. Projections 36 are preferably formed so as not to extend through liner 24 since that can impair proper sealing by the liner. Lip 30 cooperates with projections 36 to mechanically interlock the liner 24 with the projections.

Closure 10 includes a pilfer band 38 which may be optionally formed integrally with cap 12. Pilfer band 38 includes an annular band portion 40, and a plurality of circumferentially spaced, relatively flexible wings or projections 42 integral with band portion 40. Wings 42 are adapted to coact with an annular locking ring typically provided on a container neck to resist removal of the closure from the container, and thereby at least partially detaching pilfer band 38 from skirt portion 16 to clearly indicate either partial or complete closure removal. Notably, the flexibility of wings 42 provide the pilfer band 38 with a "self-engaging" action during application of closure 10 to a container so that the wings are automatically positioned to properly function, without additional manipulation steps after application of the closure to a container.

Wings 42 are preferably disposed at an angle "alpha" with respect to the axis of the closure, which facilitates application of closure 10 to a container, and also facilitates proper wing formation. Additionally, wings 42 are preferably dimensioned so that they interferingly engage and coact with the portion of the container disposed immediately below its locking ring to provide the desired resistance to closure removal. Wings 42 can be formed extending angularly inwardly of band portion 40 by a preferably acute angle "beta", defined by the angle between the line of intersection of a horizontal plane with the surface of the wing (shown as phantom line H), and a line tangent to the closure. Angle "beta" facilitates formation of wings 42 having the desired dimensions for interfering coaction with the container, while permitting formation of the wings within a mold portion of relatively smaller size than if wings 42 are formed radially (angle "beta" equals 90 degrees if wings 42 are radial).

While wings 42 are illustrated as generally flat and of generally uniform thickness, other configurations can be used. For example, wings 42 may be curved or each have a compound surface. Each wing 42 may be non-uniform in thickness to facilitate flexing or folding of the wings about a selected portion, such as at the edge of each wing integral with band portion 40. The preferred configuration of the wings 42 is such that the wings may flex during removal from a molding apparatus and during application to a container without damage, yet have sufficient rigidity to interferingly engage the container without collapsing in order to indicate closure removal.

Notably, band portion 40 includes a shoulder 44 which provides clearance for deflection of the wings 42 during application of closure 10 to a container and during various closure formation operations. In one current embodiment, wings 42 have a thickness of approximately 0.012 inches, while shoulder 44 is approximately 0.013-0.014 inches wide. To assure that available clearance is sufficient for proper pilfer band formation and closure application, wings 42 are preferably spaced and dimensioned so that the wings do not overlap each other when deflected. Related application Ser. No. 286,375, now U.S. Pat. No. 4,418,828, further discusses the configuration and operation of a pilfer band such as 38, and portions of that application not inconsistent with the present disclosure are incorporated herein by reference.

While pilfer band 38 is preferably formed integrally with skirt portion 16, the pilfer band is at least partially detachably connected to skirt portion 16 of cap 12 to indicate closure removal. To this end, a score line 46 which extends substantially or entirely about closure 10 distinguishes band portion 40 from skirt portion 16. Detachable connection of pilfer band 38 is provided by a plurality of circumferentially spaced, internal ribs 48 which extend between and are integral with skirt portion 16 and band portion 40. As will be described, score line 46 is preferably formed so that it extends partially into at least some of ribs 48, whereby the scored ribs 48 are fracturable and provide a frangible connection of pilfer band 38 to skirt portion 16. To facilitate accurate formation of score line 46, another plurality of internal ribs 50 are provided, integral with skirt portion 16. Ribs 50 act to support the closure during scoring as will be described.

Referring to FIGS. 3A–3E, the basic steps of the present closure-making process are illustrated diagrammatically. These various steps will later be described in greater detail.

Figures 3A, 3B:
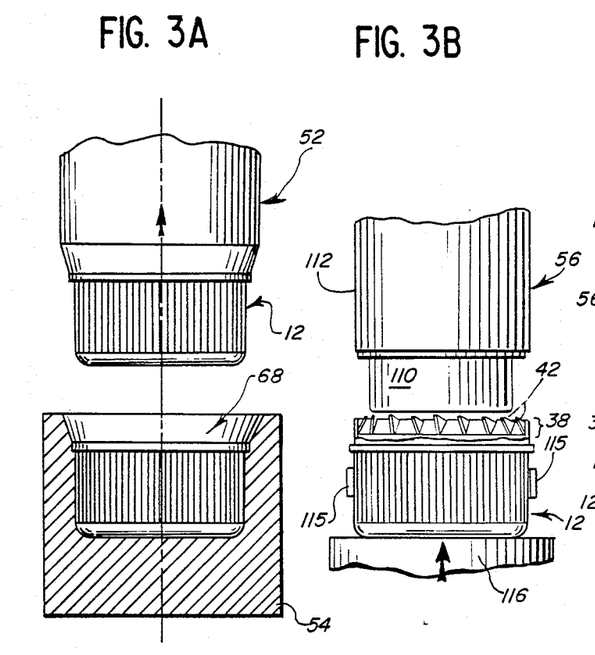
FIGS. 3A–3E diagrammatically illustrate the closure-making process and apparatus of the present invention.

As shown in FIG. 3A, plastic cap 12 is first compression molded between a male mold assembly 52 and a female mold 54. Optional pilfer band 38 can be integrally formed with cap 12 during this step.

FIG. 3B illustrates advancement of a reorientation mandrel assembly 56 into closure cap 12 having a pilfer band 38 by movement of the cap in order to reorient the wings 42 of the pilfer band after their deformation during removal from male mold assembly 52.

Figure 3C:
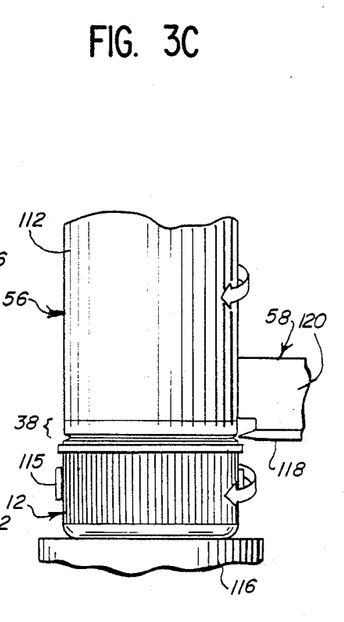

As shown in FIG. 3C, the detachable connection of pilfer band 38 to closure cap 12 is next provided by a scoring assembly 58 which scores the closure to provide score line 46 as the closure is rotated together with mandrel assembly 56.

Figure 3D:
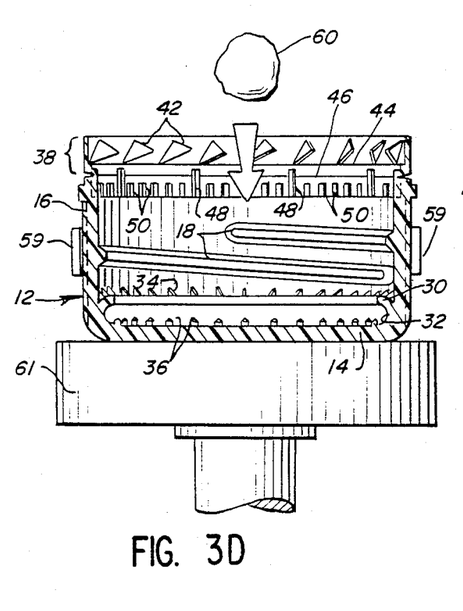
Figure 3E:
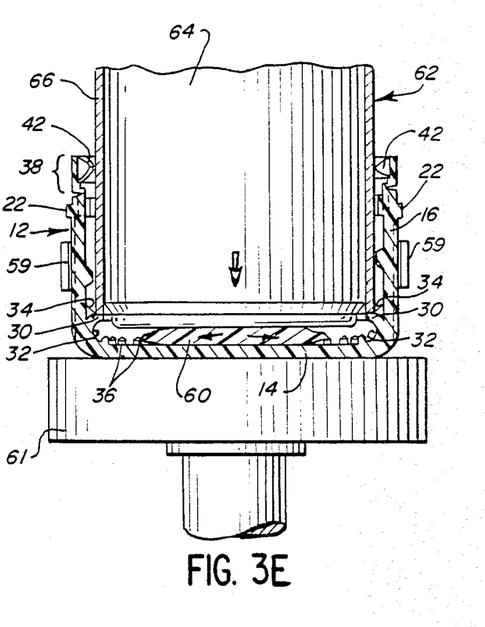

FIGS. 3D and 3E illustrate formation of an optional sealing liner within cap 12. As cap 12 is held in position by guides 59 upon support surface 61, a quantity of moldable liner-forming plastic 60 is deposited on the inner surface of top wall portion 14 of cap 12, and a liner-forming assembly 62 thereafter advanced into cap 12. Assembly 62 includes a liner-forming plunger 64 disposed coaxially within an outer sleeve 66. Plunger 64 compresses plastic 60 to form sealing liner 24 within cap 12, as sleeve 66 engages lip 30 to restrain flow of plastic 60 between plunger 66 and 30. After assembly 62 is withdrawn, formation of closure 10 is complete.

Depending upon the type of closure desired, all process steps illustrated in FIG. 3 need not be performed, and/or the sequence of the steps altered from that illustrated. For example, a closure having no sealing liner or pilfer band may be formed in accordance with the compression molding step of FIG. 3A. A closure having a pilfer band but no sealing liner can be formed in accordance with the process steps of FIGS. 3A–3C. A closure having a sealing liner but no pilfer band can be formed by compression molding of plastic cap 12 in the process step of FIG. 3A (without formation of a pilfer band), with a sealing liner then formed as in FIGS. 3D and 3E. Apparatus for closure-formation can comprise integrated machinery for performing the process steps desired, or separate pieces of equipment for performing one or more of the process steps.

Figures 4, 5:
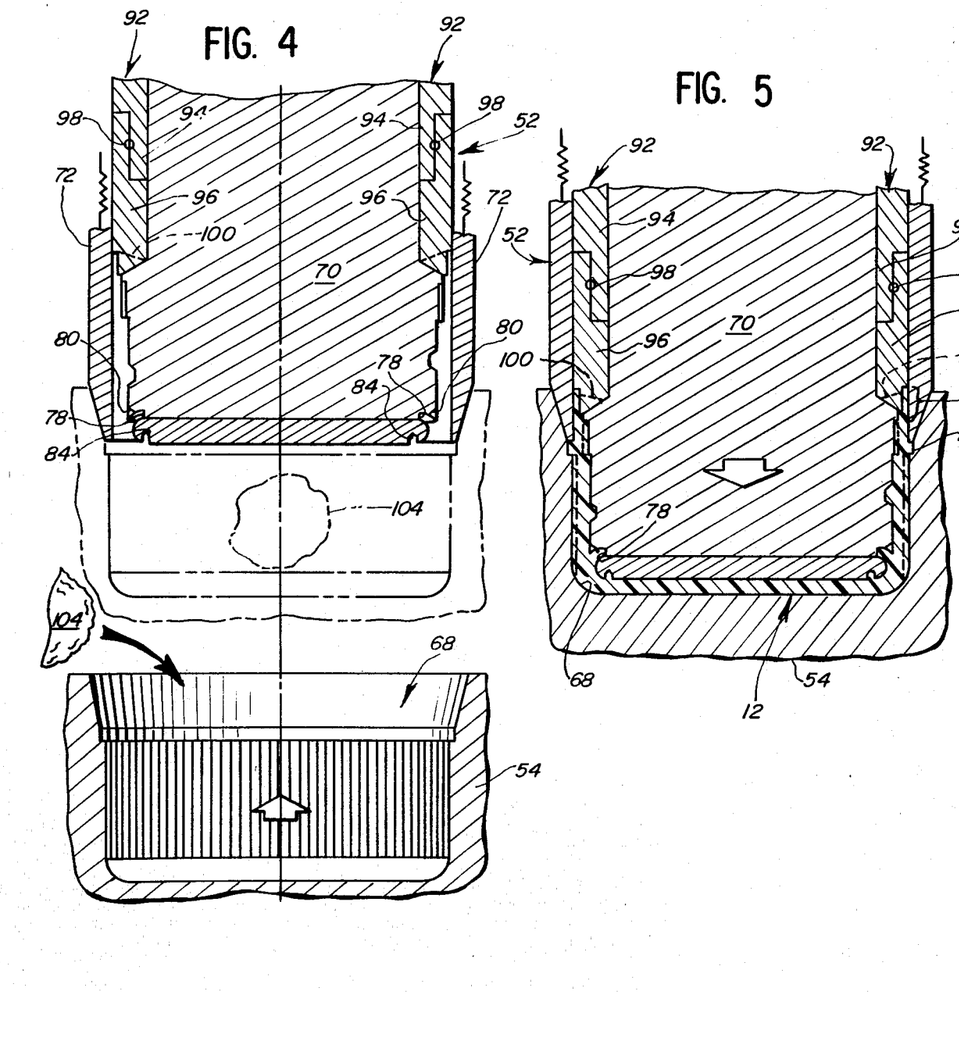
FIGS. 4–6 diagrammatically illustrate the process and apparatus for compression molding of a closure in accordance with the present invention.
Figure 6:
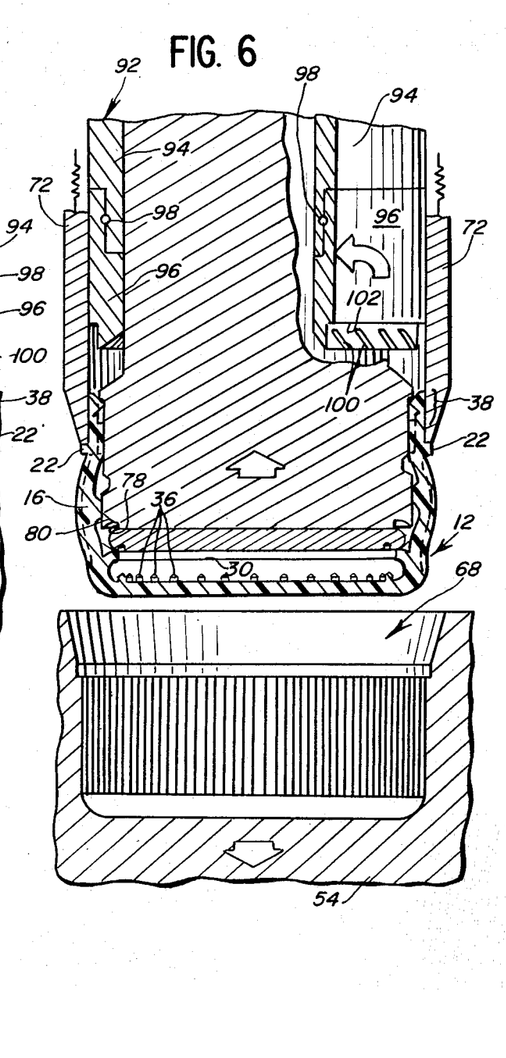

Referring to FIGS. 4–6, the compression molding apparatus and process step of FIG. 3A will be described in detail. As noted, the compression molding apparatus includes male mold assembly 52 and female mold 54. Female mold 54 defines a mold cavity 68 shaped to form the exterior surfaces of plastic closure cap 12.

Male mold assembly 52 includes a male mold plunger 70 movably disposed coaxially within an outer sleeve 72. As shown in greater detail in FIG. 8, plunger 70 is shaped to form the interior of closure 10. Plunger 70 defines thread grooves 76 for formation of thread formation 18, and an annular lip groove 78 for formation of annular lip 30. Plunger 70 may be provided with gusset slots 80 for formation of gussets 34 if desired. Plunger face 82 can be provided with one or more projection holes 84 for formation of liner projections 36.

Figures 8, 10:
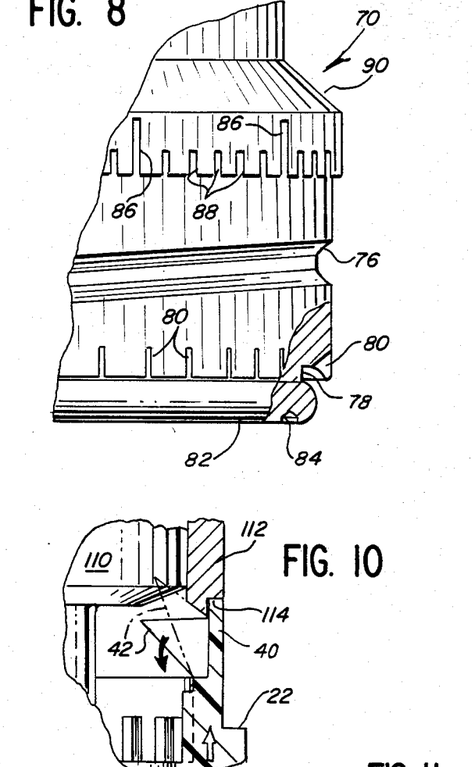
FIG. 8 is an enlarged, fragmentary side elevational view of a portion of the closure-making apparatus illustrated in FIGS. 4–6.
FIGS. 9–11 diagrammatically illustrate formation of the pilfer band portion of the closure illustrated in FIGS. 1 and 2.

Plunger 70 further defines rib slots 86 for formation of ribs 48, as well as support rib slots 88 for formation of support ribs 50. When a pilfer band 38 is formed integrally with plastic cap 12, wings 42 of the pilfer band are formed against frusto-conical surface 90 of plunger 70.

Figure 7:
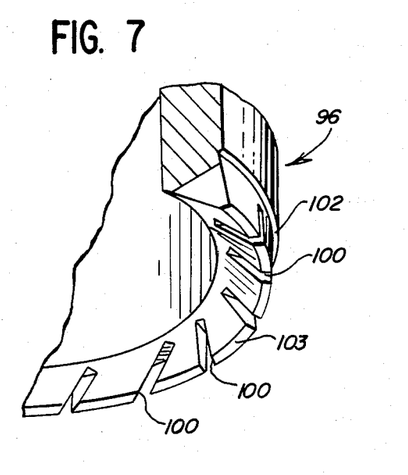
FIG. 7 is a fragmentary perspective view of a portion of the closure-making apparatus illustrated in FIGS. 4–6.

Male mold assembly 52 further includes an intermediate sleeve 92 positioned between outer sleeve 72 and plunger 70. Sleeve 92 includes a sleeve portion 94 and a rotatable mold portion 96 supported for rotation with respect to sleeve portion 94 by bearings 98. As best shown in FIG. 7, mold portion 96 includes a plurality of wing slots 100 for formation of pilfer band wings 42. Mold portion 96 defines a shoulder 102 for formation of band portion 40 of pilfer band 38, and a lower surface 103 for formation of shoulder 44 of band portion 40.

Formation of closure cap 12 with integral pilfer band 38 will now be described. If a closure without a sealing liner is to be formed, portions of plunger 70 for formation of liner-retaining lip 30 and projections 36 need not be provided. Similarly, formation of a closure without a pilfer band such as 38 can be provided by eliminating mold portion 96 within which wings 42 are formed, as well as eliminating portions of plunger 70 which provide pilfer band formation.

The molding apparatus is first positioned generally as in FIG. 4, and a predetermined quantity or charge of moldable thermoplastic, preferably molten, is deposited within mold cavity 68 of female mold 54. Female mold 54 and outer sleeve 72 are then relatively moved into engagement with each other, as indicated in phantom line in FIG. 4.

Significantly, outer sleeve 72 and female mold 54 are preferably provided with frusto-conical mating surfaces which facilitate alignment of the apparatus. This is a very important feature of the present invention. Engagement of outer sleeve 72 with female mold 54 acts to automatically correctly align the female mold with the plunger 70 reciprocably disposed within sleeve 72. Experience has shown that wear of the mold tooling is unacceptably great if sleeve 72 is not provided to facilitate alignment of female mold 54 and plunger 70 (i.e. if plunger 70 and female mold 54 are merely moved together without an outer alignment sleeve such as 72). Outer sleeve 72 is preferably spring-biased into engagement with female mold 54 to provide an alignment force on the order of several hundred pounds to facilitate correct alignment. This novel feature permits high-speed closure formation while maintaining correct finished product tolerances, a very significant advance over previous arrangements.

Compression molding of plastic charge 104 is illustrated in FIG. 5. Plunger 70 and intermediate sleeve 92 are together moved within outer sleeve 72 so that plunger 70 enters mold cavity 68 and compresses plastic charge 104 to form plastic cap 12 and pilfer band 38. Wings 42 of pilfer band 38 are formed within wing slots 100 of mold portion 96, and against surface 90 of plunger 70 against which mold portion 96 is positioned during compression.

Positive compression molding of closures has been found to provide closures having less inherent stress than closures otherwise formed. Suitable air-venting channels or other arrangements can be provided to permit escape of air during compression molding of the plastic.

Preferably, compression molding pressure is on the order of 1000-2000 pounds per square inch (psi). Notably, the molding apparatus is arranged to limit the maximum molding pressure to a predetermined value. This permits the apparatus to accommodate variations in the quantity of plastic charge 104 received within the apparatus. In this manner, each closure is correctly formed without undesired flashing of plastic. This molding technique results in slight variations in the thickness of the top wall portion 14 of the closure cap 12 attendant to variations in the quantity of plastic charge 104. Such variations in the top wall portion thickness do not impair the quality of the finished closure.

Preferably, the molding apparatus is arranged so that the plastic charge is initially compressed at the above relatively high molding pressure, with the molding pressure subsequently relatively lowered substantially to approximately 100-200 psi. This preferred procedure maintains the plastic charge in compression as the plastic sets to control closure shrinkage. By reducing the forming pressure after its initial preferred peak, a machine having multiple molding assemblies does not require the structural integrity which would be necessary if peak forming pressure is simultaneously maintained in many of the machine's molding assemblies during compression molding of closures. Similarly, a machine having multiple molding assemblies is preferably arranged to reduce the above-noted preferred alignment force provided between outer sleeve 72 and female mold 54, again so that the structural integrity of the machine need not be excessive.

If desired, female mold 54 and male plunger 70 can be rotated with respect to each other as plastic 104 is compressed, to thereby impart spiral orientation to the plastic grain for enhancing hoop strength of cap 12. Formation of cap 12 using Phillips Chemical Company HGN-020-01 polypropylene, a "Marlex" polyolefin, introduced into mold cavity 68 at approximately 400-450 degrees Fahrenheit has provided closures exhibiting the requisite strength without spiral orientation of the plastic grain.

FIG. 6 illustrates removal of cap 12 with pilfer band 38 from the male mold assembly 52 so that wings 42 are not permanently damaged. As female mold 54 and male mold assembly 52 are moved out of cooperation with each other, intermediate sleeve 92 is moved upwardly. The male plunger 70 is preferably carried by intermediate sleeve 92 by a spring-biased lost motion mechanism. As sleeve 92 moves upward, outer sleeve 72 acts against shoulder 22 of cap 12 in opposition to the spring-biasing of the lost motion mechanism to keep the plunger 70 from moving upwardly with intermediate sleeve 92. Thus, the initial movement of intermediate sleeve 92 is not imparted to plunger 70 and is "lost". By this action, wings 42 are removed from wing slots 100 in mold portion 96. Relative rotation of mold portion 96 with respect to sleeve portion 94 permits this action without damage to the preferably angularly disposed wings 42. The preferably angularly disposed wings 42 impart rotational movement to mold portion 96 in a cam-like fashion as intermediate sleeve 92 moves upwardly a sufficient distance for the wings 42 to clear wings slots 100.

After wings 42 are free of mold portion 96, intermediate sleeve 92 and male plunger 70 move together relative to outer sleeve 72 so that sleeve 72 acts against shoulder 22 of cap 12 to strip or remove the cap 12 and pilfer band 38 from plunger 70. The resilient flexibility of cap 12 permits removal in this manner without unacceptable permanent deformation of the cap. Wings 42 of pilfer band 38 are deflected upwardly during removal, their flexible nature and their angular disposition with respect to the closure axis (angle "alpha") facilitating removal in this manner. While the above "pop-off" method of closure removal from plunger 70 is preferred, closures may be unthreaded from plunger 70 by leaving the closures at least partially within female mold 54 and relatively rotating the female mold and plunger 70 during closure removal. Alternately, closures can be unthreaded from plunger 70 by providing the lower portion of outer sleeve 72 with serrations or teeth to form like teeth on the closure meshed with the teeth of the sleeve 72, and by then relatively rotating outer sleeve 72 and plunger 70.

Figure 9:
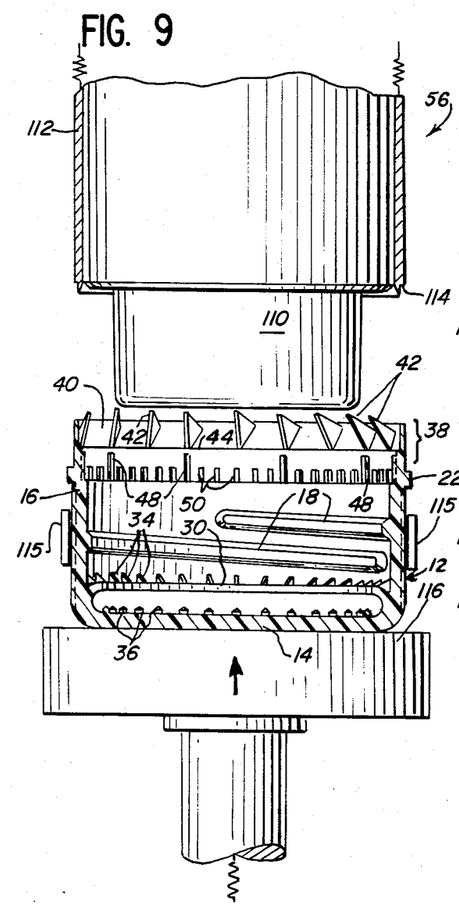
Figure 11:
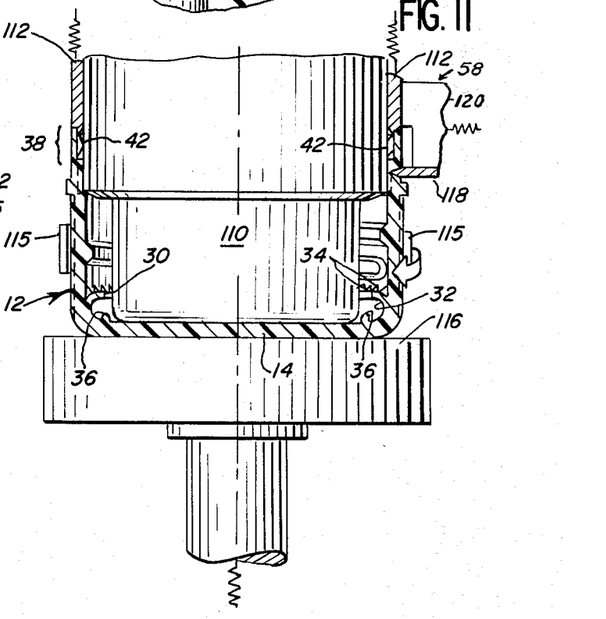

Referring to the process step illustrated in FIG. 3B and in greater detail in FIGS. 9-11, reorientation of wings 42 of pilfer band 38 is illustrated. During removal from male plunger 70 as described, wings 42 are each moved in a first direction from their original molded disposition, and appear generally as in FIG. 9. Disposition of wings 42 at angle "alpha" assures that all of the wings move in the same general direction. To position the wings generally in their original molded configuration for cooperation with a container, wings 42 can be reoriented by movement in a second direction opposite to the direction they are deflected during removal from plunger 70. Reorientation in this manner is provided by mandrel assembly 56. Assembly 56 includes a mandrel 110 disposed within outer sleeve 112. Outer sleeve 112 acts with mandrel 110 to reorient wings 42.

As cap 12 with pilfer band 38 is supported upon surface 116, surface 116 and assembly 56 are relatively moved toward each other. Guides 115 are provided to maintain cap 12 in position. As mandrel 110 enters and is received within cap 12, spring-biased outer sleeve 112 engages wings 42 and begins to reorient the wings. A shoulder 114 of sleeve 112 then seats against band portion 40 of pilfer band 38 as mandrel 110 and toward top wall portion 14 move toward each other and the mandrel completes reorientation of the wings 42. Mandrel 110 firmly engages top wall portion 14 of cap 12, with wings 42 urged toward band portion 40. Shoulder 44 of the band portion provides clearance to permit movement of wings 42 in this manner without excessive permanent deformation of the wings. Angle "alpha" of each wing permits proper reorientation without relative rotation of the closure and mandrel 110. When mandrel 110 and the closure are moved apart after closure scoring, the wings 42, by their resilient memory, generally resume the configuration in which they were originally molded.

Referring to FIGS. 3C and 11, detachable connection of pilfer band 38 to cap 12 is provided by scoring assembly 58. The scoring assembly includes a scoring knife 118 carried by a knife support 120. The closure being formed and knife 118 are brought into engagement with each other, with score line 46 preferably formed by rotation of the closure together with mandrel assembly 56 to provide a slicing-like cutting action.

Score line 46 is formed distinguishing pilfer band 38 from skirt portion 16. At least some of ribs 48 are partially cut or scored to render them frangible, thereby providing at least partial detachable connection of pilfer band 38 to cap 12. Knife support 120 is preferably arranged to engage outer sleeve 112 of mandrel assembly 56 to assure the accuracy of the depth of score line 46. Knife support 120 is preferably spring-biased into engagement with mandrel assembly 56 to compensate for any wear in the mandrel assembly to provide accurate scoring. Notably, internal support ribs 50 (as well as ribs 48) firmly engage mandrel 110 to assure correct formation of score line 46, and to provide sufficient clearance so that knife 118 does not contact mandrel 110. Additionally, support surface 116 is preferably spring-biased so that the closure is held snugly and securely to prevent slipping during scoring.

In one current closure embodiment, ribs 48 are provided having a depth or thickness of approximately 0.014 inches and a width of approximately 0.025 inches. After closure scoring, fracturable ribs have a residual thickness of preferably approximately 0.008–0.012 inches. These dimensions are intended as illustrative since other fracturable arrangements can be formed.

If pilfer band 38 is to remain partially attached to cap 12 after removal of the closure from a container, score line 46 can be formed extending less than completely about the closure. Similarly, some of ribs 48 can be left unscored so that they are not frangible. In this regard, band portion 40 of pilfer band 38 can be scored or otherwise arranged to fail (such as by molding in of a preferentially weak area) so that during closure removal from a container, band portion 40 splits and the pilfer band remains partially attached to the cap 12. Formation of pilfer band 38 to fail in this manner is achieved by providing a suitable scoring knife for generally vertically cutting band portion 40 of the pilfer band in conjunction with partial detachable connection of band portion 40 to skirt portion 16. Such a scoring knife is preferably provided to score the band portion 40 in two places spaced from each other a distance other than the relative spacing of wings 42. In this way, band portion 40 will fail as intended even if one of the scores in band portion 40 is made at or through one of wings 42. Such scoring of band portion 40 can be made at an angle corresponding to angle "alpha" of the wings 42 to further avoid incorrect failure of the pilfer band which can result if one of the wings 42 keeps band portion 40 from failing as intended.

Referring to FIGS. 3D and 3E, cap 12 with pilfer band 38 appears generally as in FIG. 3D after scoring and wing reorientation as described. Formation of closure 10 as shown in FIGS. 1 and 2 is now completed by formation of sealing liner 24.

To this end, a predetermined quantity of moldable thermoplastic, preferably molten, is deposited within cap 12 against the inner surface of top wall portion 14. Liner forming assembly 62 is next advanced into cap 12 to form liner 24. Outer sleeve 66 is moved into firm engagement against annular lip 30 of cap 12. Notably, the above-described, preferred one-directional flexibility of lip 30 permits the lip to support sleeve 66, and reinforcing gussets 34 are dimensioned to permit firm engagement of the sleeve 66 with lip 30. Depending upon the desired finished dimensions of the final closure product, sleeve 66 may be provided so as to outwardly stretch cap 12 as the sleeve is advanced into the cap to provide sufficient clearance for the sleeve without undesired permanent deformation of the closure. For manufacture of some closures, particularly those in which the inside diameter of lip 30 is greater than or not much smaller than the inside diameter of thread formation 18, a stretching sleeve fitted coaxially about outer sleeve 66 can be advanced into cap 12 with sleeve 66 to stretch the cap 12 either at or above thread formation 18 so that sleeve 66 properly engages lip 30. Such a stretching sleeve can comprise a suitably slotted expanding collet having axially extending fingers arranged to expand outwardly in response to axial movement of sleeve 66 within the collet. When finished closure dimensions permit it, lip 30 is preferably formed with an inside diameter less than the inside diameter of thread formation 18 to facilitate engagement of sleeve 66 with lip 30.

After sleeve 66 engages lip 30, liner forming plunger 24 is further advanced into cap 12 to compress plastic 60 so that it flows outwardly into annular recess 32 and against lip 30 to form sealing liner 24. The liner is compression molded with pressure preferably on the order of 1000–2000 psi, with sleeve 66 restraining flow of plastic 60 between plunger 64 and lip 30. When cap 12 is formed with liner-engaging projections 36, plastic 60 flows about the projections so that the resultant liner 24 is securely mechanically interlocked with the projections. After liner-forming assembly 62 is withdrawn, formation of closure 10 is complete.

As noted, formation of some closures requires stretching of cap 12 during formation of sealing liner 24 to assure firm engagement of sleeve 66 with lip 30. Thread formation 18 can be truncated, as shown, to provide clearance for sleeve 66, but sufficient clearance must be provided so that sleeve 66 need not be excessively thin-walled.

When a lined closure is formed with pilfer band 38, stretching of only cap 12 to provide clearance for lip-engaging sleeve 66 can result in undesired failure of scored frangible ribs 48 during liner formation. Thus, formation of a closure with a sealing liner 24 and a pilfer band 28, where stretching of cap 12 is required for liner formation, requires simultaneous stretching of cap 12 and pilfer band 38 to prevent unintended failure of ribs 48. Alternately, liner 24 can be formed prior to closure scoring (formation of score line 46.) When liner 24 is formed before the closure is scored, the liner-forming apparatus can be arranged to reorient the pilfer band wings 42 in the desired manner during liner formation. The closure can thereafter be scored to distinguish pilfer band 38 from skirt portion 12 to provide the desired at least partial detachable connection of the pilfer band to cap 12.

Although the presently preferred embodiment of the present invention has been shown and described, it is to be understood that various modifications and substitutions can be made by those skilled in the art without departing from the novel spirit and scope of this invention.

What is claimed is:

1. A process for making a composite closure for a container, comprising the steps of:
   forming a plastic cap having a top wall portion, an internally threaded annular skirt portion, and an inwardly extending, annular liner-retaining lip;
   depositing a quantity of moldable plastic in said cap; and
   forming a liner including a generally inwardly facing sealing surface with said moldable plastic so that said moldable plastic flow against said lip and said lip retains said liner within said cap.

2. The process for making a closure in accordance with claim 1, wherein
said liner forming step includes advancing a liner-forming plunger into said cap to compress said moldable plastic to form said liner while restraining the flow of the moldable plastic between said plunger and said annular lip.

3. The process for making a closure in accordance with claim 2, and
advancing a lip-engaging sleeve into said cap coaxially with said liner-forming plunger so that said sleeve engages said lip to restrain the flow of said moldable plastic between said plunger and said lip.

4. The process for making a closure in accordance with claim 3, and
stretching said cap during said liner-forming step to provide sufficient clearance for said lip-engaging sleeve.

5. The process for making a closure in accordance with claim 1, wherein
said liner-retaining lip is formed with a non-horizontal surface generally facing said top wall portion.

6. The process for making a closure in accordance with claim 5, and
forming a plurality of circumferentially spaced reinforcing gussets integral with said annular lip.

7. The process for making a closure in accordance with claims 1, 3, or 6, and
forming at least one liner-engaging projection integral with said top wall portion for retaining said liner within said cap.

8. The process for making a closure in accordance with claim 7, wherein
said projection forming step includes forming a plurality of said projections integrally with said top wall portion for cooperating with said lip to retain said liner within said cap.

9. A process for making an internally threaded plastic closure, comprising the steps of:
providing a female mold and a male mold, said male mold including an outer sleeve and a male plunger coaxially disposed within said outer sleeve;
providing said female mold and said outer sleeve with respective frusto-conical mating surfaces;
placing a quantity of moldable plastic in said female mold;
relatively moving said female mold and said outer sleeve so that said respective mating surfaces are moved into engagement with each other;
moving said male plunger within said outer sleeve and into said female mold to compress said plastic to form said closure;
disengaging said female mold and said outer sleeve from each other; and
moving said outer sleeve and male plunger relative to each other so that said outer sleeve removes said closure from said male plunger.

10. The process for making a closure in accordance with claim 9, and
accommodating variations in said quantity of moldable plastic by limiting the maximum molding pressure during compression of said plastic.

11. The process for making a closure in accordance with claim 10, wherein
during compression of said plastic, said plastic is first subjected to relatively high pressure and subsequently subjected to relatively low pressure.

12. The process for making a closure in accordance with claim 9, and
forming a sealing liner in said closure by depositing a quantity of liner-forming plastic in said closure and subjecting said liner-forming plastic to compression for forming said liner.

13. A process for making a closure in accordance with claim 9, including
forming liner-retaining lip means extending inwardly of an annular skirt portion of said plastic closure in spaced relation to a top wall portion of said closure.

14. A process for making a composite closure for a container, comprising the steps of:
compression molding a plastic cap having a top wall portion, an annular skirt portion, an internal thread formation on said skirt portion, and an inwardly extending annular lip spaced from said top wall portion and defining an annular recess therewith;
depositing a quantity of liner-forming plastic on the inner surface of said top wall portion; and
compressing said liner-forming plastic with plunger means to cause said plastic to flow into said annular recess to form a liner within said cap.

15. A process for making a closure in accordance with claim 14, wherein
molding of said plastic cap includes forming at least one liner-engaging projection integral with said top wall portion for retaining said liner within said cap.

16. A process for making a closure in accordance with claim 15, including
forming a plurality of said liner-engaging projections in circumferentially spaced relation, said projections being at least partially disposed within said annular recess for cooperation with said annular lip for retaining said liner within said cap.

17. A process for making a closure in accordance with claims 14 or 16, and
forming a pilfer band detachably connected to said annular skirt portion including a plurality of circumferentially spaced relatively flexible wings adapted to engage said container during removal of said closure therefrom for at least partially detaching said pilfer band from said skirt portion.

18. A process for making a closure in accordance with claim 17, wherein
said pilfer band is formed integrally with said skirt portion during said compression molding step, and the closure is thereafter scored to distinguish the pilfer band from the skirt portion to at least partially detachably connect the pilfer band to the skirt portion.

19. A process for making a closure in accordance with claim 18, wherein
said closure is scored prior to formation of said liner.

20. A process for making a closure in accordance with claim 18, wherein
said liner is formed prior to scoring of said closure.

21. A process for making a closure for a container, comprising the steps of:
compression molding a plastic cap having a top wall portion and an annular skirt portion; and
forming a pilfer band having an annular band portion at least partially detachably connected to said skirt portion and including a plurality of relatively flexible projections integral with said band portion, said projections being positioned to extend inwardly of said band portion for engaging said container during removal of said closure therefrom for at least partially detaching said pilfer band from said annular skirt.

22. A process for making a closure in accordance with claim 21, including
forming said projections at an acute angle with respect to the axis of said closure.

23. A process for making a closure in accordance with claim 22, including
forming said projections within a mold portion, and relatively rotating said mold portion and said plastic cap during removal of said projections from said mold portion.

24. A process for making a closure in accordance with claim 21, including
reorienting said flexible projections after removal of said closure from a mold assembly within which said closure is formed.

25. A process for making a closure in accordance with claim 24, wherein
said projections are each moved in a first direction during removal from said mold assembly from the orientation in which each is initially formed, said projections being reoriented by movement of each in a second direction opposite said first direction.

26. A process for making a closure in accordance with claim 25, wherein
said projections are reoriented by insertion of a projection-engaging mandrel into said closure.

27. A process for making a closure in accordance with claim 26, wherein
said projections are reoriented by engagement of a sleeve positioned coaxially about said mandrel with said projections prior to engagement of said mandrel with said projections.

28. A process for making a closure in accordance with claim 21,
detachably connecting said pilfer band to said annular skirt portion by forming said pilfer band integrally with said annular skirt, and scoring said closure so that said band portion is detachably connected to at least a portion of said skirt portion by frangible means.

29. A process for making a closure in accordance with claim 28, and
forming said closure with a plurality of ribs integral with said skirt portion and said band portion so that during said scoring at least some of said ribs are scored to provide said frangible means.

30. A process for making a closure in accordance with claim 29, and
supporting the inside of said closure during said scoring by providing another plurality of ribs integral with said skirt portion which are adapted to engage a mandrel positioned within said closure during said scoring.

31. A process for making a closure in accordance with claim 30, and
reorienting said projections with said mandrel as it is inserted into said closure by moving each projection in a direction opposite to the direction each projection is moved as said closure in removed from a mold assembly in which said closure is formed.

32. A process for making a closure in accordance with claims 21 or 29, and
forming a sealing liner within said plastic cap by depositing liner-forming plastic in said cap and forming a liner with said plastic.

33. A process for making a closure in accordance with claim 22, including
forming said projections so that said projections are dimensioned to interferingly engage a portion of an associated container disposed immediately below a locking ring portion of the container.

34. A process for making a composite closure for a container, comprising the steps of:
compression molding a plastic cap having a top wall portion, an integral annular skirt portion, an internal thread formation on said skirt portion adapted to cooperate with a like thread formation on said container, an inwardly extending annular lip spaced from said top wall portion and defining an annular recess therewith, and a plurality of liner-engaging projections integral with said top wall portion;
depositing a quantity of moldable, liner-forming plastic in said cap; and
compression molding said moldable plastic so that said plastic flows into said annular recess to form a sealing liner in said cap, said lip and said projections cooperating to retain said liner within said cap.

35. A process for making a closure in accordance with claim 34, and
forming a pilfer band at least partially detachably connected to said annular skirt having a band portion at least partially detachably connected to said skirt portion and a plurality of circumferentially spaced, relatively flexible wings integral with said band portion, including forming said wings at an acute angle with respect to the axis of said closure so that said wings are adapted to engage said container during removal of said closure therefrom for at least partially detaching said pilfer band from said skirt portion.

36. A process for making a closure in accordance with claim 35, and
at least partially detachably connecting said pilfer band to said skirt portion by forming a plurality of internal ribs each extending between and integral with said band portion and said skirt portion, and scoring said closure to distinguish said band portion and said skirt portion from each other and to partially cut at least some of said ribs so that at least some of said ribs are frangible and detachably connect said band portion to said skirt portion.

37. The process for making a closure in accordance with claim 34, including
forming said sealing liner with a disc-shaped configuration including a relatively thick annular sealing bead portion positioned adjacent to said annular lip,
said plastic cap being formed with the inside surface of said top wall portion being substantially flat except for said plurality of liner-engaging projections positioned in circumferentially spaced relation for engagement with the annular sealing bead portion of said liner.

38. An apparatus for making a composite closure for a container, comprising:

molding means for forming a plastic cap having a top wall portion, an internally threaded annular skirt portion, and an inwardly extending, annular liner-retaining lip;

means for depositing a quantity of moldable plastic in said cap; and means for forming a sealing liner including a generally inwardly facing sealing surface with said moldable plastic so that said moldable plastic flows against said lip and said lip retains the liner within said cap.

39. The apparatus in accordance with claim 38, wherein said liner forming means comprises a liner-forming plunger adapted to be advanced into said cap to compress said moldable plastic to form said liner, and means adapted to engage said annular lip while said moldable plastic is compressed.

40. The apparatus in accordance with claims 38 or 39, wherein said molding means includes means for forming a plurality of circumferentially spaced gussets integral with said annular lip for reinforcing said annular lip.

41. The apparatus in accordance with claims 38 or 39, wherein said molding means includes means for forming at least one liner-engaging projection integral with said top wall portion.

42. The apparatus in accordance with claims 38 or 39, wherein said molding means includes means for forming a plurality of circumferentially spaced liner-engaging projections in association with said lip, said projections being at least partially disposed within an annular recess defined between said lip and said top wall portion for cooperating with said lip to retain said liner within said cap.

43. The apparatus in accordance with claim 38, including means for forming a pilfer band at least partially detachably connected to said skirt portion.

44. The apparatus in accordance with claim 43, wherein said pilfer band forming means includes means for forming a pilfer band having a band portion integral with said annular skirt and a plurality of relatively flexible projections extending inwardly of said band portion integrally therewith, and means for forming at least one frangible connection between said skirt portion and said band portion, said flexible projections being adapted to engage said container during removal of said closure therefrom for at least partially detaching said pilfer band from said cap by fracture of said frangible connection.

45. The apparatus in accordance with claim 44, wherein said connection forming means comprises means for forming a plurality of internal ribs extending between and integral with said band portion and said skirt portion, and means for scoring said closure to at least partially distinguish said band portion from said skirt portion and to partially cut at least one of said ribs to provide said frangible connection.

46. The apparatus in accordance with claims 43, 44, or 45, and means for forming at least one liner-engaging projection integral with said top wall portion.

47. A process for making a closure for a container, comprising the steps of:

forming a plastic cap having a top wall portion and an annular skirt portion;

forming a pilfer band having an annular band portion at least partially detachably connected to said skirt portion and including a plurality of relatively flexible, inwardly extending projections integral with said band portion, said projections being adapted to engage said container during removal of said closure therefrom for at least partially detaching said pilfer band from said annular skirt;

forming said projections at an angle with respect to the axis of said closure; and forming said projections within a rotatable mold portion so that said mold portion rotates during removal of said projections therefrom.

48. A process for making a closure in accordance with claim 47, including reorienting said flexible projections after removal of said closure from a mold assembly within which said closure is formed.

49. A process for making a closure in accordance with claim 48, wherein said projections are each moved in a first direction during removal from said mold assembly from the orientation in which each is initially formed, said projections being reoriented by movement of each in a second direction opposite said first direction.

50. A process for making a closure in accordance with claim 49, wherein said projections are reoriented by insertion of a projection-engaging mandrel into said closure.

51. A process for making a closure in accordance with claim 50, wherein said projections are reoriented by engagement of a sleeve positioned coaxially about said mandrel with said projections prior to engagement of said mandrel with said projections.

52. A process for making a closure for a container, comprising the steps of:

forming a plastic cap having a top wall portion and an annular skirt portion;

forming a pilfer band having an annular band portion at least partially detachably connected to said skirt portion and including a plurality of relatively flexible, inwardly extending projections integral with said band portion, said projections being adapted to engage said container during removal of said closure therefrom for at least partially detaching said pilfer band from said annular skirt;

detachably connecting said pilfer band to said annular skirt portion by forming said pilfer band integrally with said annular skirt, and scoring said closure so that said band portion is detachably connected to at least a portion of said skirt portion by frangible means;

forming said closure with a plurality of ribs integral with said skirt portion and said band portion so that during said scoring at least some of said ribs are scored to provide said frangible means;

supporting the inside of said closure during said scoring by providing another plurality of ribs integral with said skirt portion which are adapted to engage a mandrel positioned within said closure during said scoring; and reorienting said projections with said mandrel as it is inserted into said closure by moving each projection in a direction opposite to the direction each projection is moved as said closure is removed from a mold assembly in which said closure is formed.

* * * * *